(12) United States Patent
Hoole et al.

(10) Patent No.: US 12,003,214 B2
(45) Date of Patent: Jun. 4, 2024

(54) HEAT EXCHANGE SYSTEM

(71) Applicant: HOOLE ENTERPRISES PTY LTD, Turramurra (AU)

(72) Inventors: Thomas Hoole, Turramurra (AU); Eric Hawkins, Wimborne (GB)

(73) Assignee: HOOLE ENTERPRISES PTY LTD, St Ives (AU)

( * ) Notice: Subject to any disclaimer, the term of this patent is extended or adjusted under 35 U.S.C. 154(b) by 74 days.

(21) Appl. No.: 17/046,146

(22) PCT Filed: Apr. 11, 2019

(86) PCT No.: PCT/AU2019/050326
§ 371 (c)(1),
(2) Date: Oct. 8, 2020

(87) PCT Pub. No.: WO2019/195891
PCT Pub. Date: Oct. 17, 2019

(65) Prior Publication Data
US 2021/0036655 A1 Feb. 4, 2021

(30) Foreign Application Priority Data
Apr. 11, 2018 (AU) ................. 2018901191

(51) Int. Cl.
*F28D 9/00* (2006.01)
*H02S 40/42* (2014.01)

(52) U.S. Cl.
CPC .......... *H02S 40/425* (2014.12); *F28D 9/0056* (2013.01)

(58) Field of Classification Search
CPC ...... H02S 40/425; H02S 40/44; F28D 9/0056; Y02E 10/44; Y02E 10/50; Y02E 10/60;
(Continued)

(56) References Cited

U.S. PATENT DOCUMENTS 6,082,353 A * 7/2000 van Doorn ............ F24S 10/753
29/890.036
2007/0272295 A1* 11/2007 Rubin ................. H01L 31/0543
136/246
(Continued)

FOREIGN PATENT DOCUMENTS

DE 10 2010 037 500 3/2012
EP 1 873 843 1/2008
(Continued)

OTHER PUBLICATIONS

English machine translation of KR 101080111 B1 (Year: 2023).*
(Continued)

*Primary Examiner* — Angelo Trivisonno
(74) *Attorney, Agent, or Firm* — HSML P.C.

(57) ABSTRACT

A heat exchange unit for a solar photovoltaic panel comprising backing plate comprising U-channeling depressed in an upper surface thereof flexible tubing positioned within the U-channeling configured to carry fluid; and rear panel, the rear panel being positioned behind the backing plate, the rear panel having a reflective surface to reflect heat from the backing plate; wherein the heat exchange unit is configured to be positioned in thermal contact with a solar panel, with the flexible tubing between the backing plate and solar photovoltaic panel to facilitate heat exchange between the flexible tubing and the solar panel.

22 Claims, 11 Drawing Sheets

(58) Field of Classification Search
CPC .. F24S 10/70; F24S 40/55; F24S 80/30; F24S 90/00; H01L 31/0521
See application file for complete search history.

(56) References Cited

U.S. PATENT DOCUMENTS

| | | |
|---|---|---|
| 2009/0223511 A1 | 9/2009 | Cox |
| 2012/0247538 A1 | 10/2012 | Zhao et al. |
| 2016/0036378 A1 | 2/2016 | Gray |
| 2018/0191296 A1* | 7/2018 | Lehmann .............. H02S 40/425 |

FOREIGN PATENT DOCUMENTS

| | | | |
|---|---|---|---|
| JP | 2015-211619 | 11/2015 | |
| KR | 101037301 | 5/2011 | |
| KR | 101080111 B1 * | 11/2011 | ........... H02S 40/425 |
| WO | WO-2016065045 A1 * | 4/2016 | ........... B01D 1/0035 |
| WO | 2017/001485 | 1/2017 | |

OTHER PUBLICATIONS

International Search Report issued in International Application No. PCT/AU2019/050326, dated Jun. 3, 2019, 6 pages.
Written Opinion of the International Searching Authority, issued in International Application No. PCT/AU2019/050326, dated Jun. 3, 2019, 8 pages.
Examination Report issued in corresponding Australian Patent Application No. 2019251770, dated Jun. 29, 2022, 5 pages.
Extended European Search Report issued in corresponding European Patent Application No. 19785232.0, dated Nov. 24, 2021, 5 pages.

* cited by examiner

HEAT EXCHANGE SYSTEM

FIELD OF THE INVENTION

The present invention relates to a heat exchange system and, in particular, to a heat exchange unit for a solar photovoltaic panel.

BACKGROUND OF THE INVENTION

Solar photovoltaic panel electrical conversion efficiency degrades with increased temperature. For example, a 250 W rated photovoltaic panel may only output 170 W at 70° C.

The present invention seeks to provide a way to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

In a first aspect the invention provides a heat exchange unit for a solar photovoltaic panel comprising:
  backing plate comprising U-channeling depressed in an upper surface thereof;
  flexible tubing positioned within the U-channeling configured to carry fluid; and
  rear panel, the rear panel being positioned behind the backing plate, the rear panel having a reflective surface to reflect heat from the backing plate;
  wherein the heat exchange unit is configured to be positioned in thermal contact with a solar panel, with the flexible tubing between the backing plate and solar photovoltaic panel to facilitate heat exchange between the flexible tubing and the solar panel.

Embodiments of the heat exchange unit are self-contained and can be fitted to a solar photovoltaic panel to regulate the temperature of the solar photovoltaic panel.

In embodiments the flexible tubing is arranged to carry fluid around the plate in a continuous path, the heat exchanger having an inlet for receiving fluid into the heat exchanger and an outlet for passing fluid out of the heat exchanger, the heat exchange unit configured to facilitate heat exchange between the fluid and the solar panel.

Advantages of such embodiments are that the heat exchange unit can simply be connected into the fluid path of a fluid system. Control of the properties of the fluid, including temperature, pressure, and flow rate allows management of heat exchange between the solar photovoltaic panel and the fluid.

In embodiments the U-channeling is configured to provide contact surface area between the surface of the U-channeling and the surface of the flexible tubing.

In embodiments the flexible tubing is configured to be pressurised to expand the flexible tubing within the U-channeling to increase the contact surface area. Such embodiments allow improved thermal connection between the flexible tubing and the U-channeling by increasing the contact surface area.

Embodiments comprise a metallic layer positioned across the flexible tubing, configured to be positioned between the flexible tubing and the solar photovoltaic panel when the heat exchange unit is affixed to a solar photovoltaic panel. Such embodiments contain the flexible tubing and avoid exposure of the flexible tubing. The metallic layer increases the thermal connection between the backing plate and the flexible tubing.

In embodiments the rear panel reflects heat from the backing plate at lower temperatures but acts as a heat sink in higher temperatures. Such embodiments enable heat to be contained within the unit but also to allow exchange of heat out of the unit to avoid overheating.

Depending on the climate the panel is installed in, varying degrees of insulating material may be placed inside the rear panel. Cooler climates with lower maximum day time temperatures may be able to cover a greater percentage of the internal face of the rear panel thereby maximising the efficiency with less risk of over heating and subsequent boiling of the transfer fluid.

In embodiments at least one spacer separates the rear panel from the backing plate. Such embodiments avoid contact between the backing plate and the rear panel to reduce heat exchange between the backing plate and the rear panel.

In embodiments the heat exchanger is divided into a plurality of heat cells, the heat cells being defined by insulation positioned between the backing plate and the rear panel, the insulation being configured to limit airflow along the length of the heat exchanger. Such embodiments prevent airflow along the length of the heat exchanger to reduce temperature gradients across the heat exchange unit.

In embodiments the heat exchange unit is maintained in thermal contact with the solar photovoltaic panel by at least one rearward affixation bar affixing the heat exchanger to the solar panel, the rearward affixation bar being configured to engage with the solar photovoltaic panel, the rearward affixation bar being sprung to drive the heat exchanger into contact with the solar panel. Such embodiments improve surface contact between the heat exchange unit and the solar photovoltaic panel.

In embodiments the heat exchange unit being configured to retrofit into a solar photovoltaic panel.

In a second embodiment the invention provides a heat exchanger for a solar photovoltaic panel comprising
  backing plate comprising U-channeling depressed in an upper surface thereof; and
  flexible tubing positioned within the U-channeling configured to carry fluid;
  wherein the heat exchanger is configured to be positioned in thermal contact with a solar panel, with the flexible tubing between the backing plate and solar photovoltaic panel to facilitate heat exchange between the flexible tubing and the solar panel.

In embodiment the flexible tubing is arranged to carry fluid around the plate in a continuous path, the flexible tubing having a tubing inlet for receiving fluid into the heat exchanger and an outlet for passing fluid out of the heat exchanger, the heat exchanger configured to facilitate heat exchange between the fluid and the solar panel.

In embodiments the U-channeling is configured to provide contact surface area between the surface of the U-channeling and the surface of the flexible tubing.

In embodiments the flexible tubing configured to be pressurised to expand the flexible tubing within the U-channeling to increase the contact surface area.

In embodiments a metallic layer is positioned across the flexible tubing, configured to be positioned between the flexible tubing and the solar photovoltaic panel when the heat exchanger is affixed to a solar photovoltaic panel.

Embodiments further comprise a rear panel, the rear panel being positioned behind the rear panel, the rear panel having a reflective surface to reflect heat from the backing plate.

In embodiments the rear panel reflect heat from the backing plate at lower temperatures but acts as a heat sink in higher temperatures.

Embodiments comprise at least one spacer to separate the rear panel from the backing plate.

In embodiments the heat exchanger is divided into a plurality of heat cells, the heat cells being defined by insulation positioned between the backing plate and the rear panel, the insulation being configured to limit airflow along the length of the heat exchanger.

In embodiments the heat exchanger is maintained in thermal contact with the solar photovoltaic panel by at least one rearward affixation bar affixing the heat exchanger to the solar panel, the rearward affixation bar being configured to engage with the solar photovoltaic panel, the rearward affixation bar being sprung to drive the heat exchanger into contact with the solar panel.

In a third aspect the invention provides a heat exchange unit for a solar photovoltaic panel comprising:
a heat exchanger according to the second aspect;
a frame to contain the heat exchanger.

In a fourth aspect the invention provides a photovoltaic thermal heat exchange system comprising at least one solar photovoltaic panel and at least one heat exchange unit affixed to the solar photovoltaic panel, the heat exchange unit in accordance with the first or second aspect, each heat exchange unit being connected to a fluid path, the system being configured to carry fluid from a pump through the fluid path and through the flexible tubing of the heat exchanger.

Embodiments further comprise at least one temperature sensor to monitor the temperature of fluid in the fluid path.

Embodiments further comprise a flow rate control unit, the flow rate control unit being configured to control the rate of flow of fluid around the system in dependence on the temperature of fluid.

Embodiments further comprise at least one pressure sensor positioned in the fluid path.

In a fifth aspect the invention provides a manifold for a solar thermal heat exchange system, the manifold being configured to provide a fluid connection to a heat exchange unit, the manifold comprising a tube and having at least one extension pipe extending from the tube, the extension pipe being suitable for quick-fit connection to the heat exchanger to carry fluid between the manifold and a flexible pipe of the heat exchanger.

In a sixth aspect the invention provides a heat exchanger panel configured for use with a solar photovoltaic panel, including by way of retrofit.

The heat exchanger panel comprises a thermally conductive metallic backing sheet comprising U-channeling depressed in an upper surface thereof. Furthermore, fluid channeling flexible tubing is reticulated within the U-channeling.

Metallic foil may be adhered over the flexible tubing to retain the flexible tubing within the U-channeling.

The heat exchanger panel is configured to be adhered to a rear surface of a solar photovoltaic panel.

The thermally conductive metallic backing draws heat from the solar photovoltaic panel which is cooled by coolant, such as water, flowing through the flexible tubing.

As such, the present arrangement increases energy capture by not only cooling the solar photovoltaic panel and increasing the electrical energy conversion efficiency thereof, but also allowing for simultaneous thermal energy capture. For example, the present arrangement may allow the solar photovoltaic panel to operate at near optimal efficiencies (such as at 250 W as opposed to 170 W as alluded to above), thereby increasing electrical energy conversion efficiency by up to 20%

The configuration embodiments of the invention allows for low-cost relatively simple manufacture thereof wherein a generally low cost sheet of metal can be cut and formed in a low cost mass production process where after the relatively low cost flexible tubing can be relatively easily reticulated within the U-channeling and enclosed using adhesive metallic foil thereatop.

Furthermore, whereas flexible tubing is not especially thermally conductive nor generally used for applications requiring thermal conductivity, the metallic backing sheet is able to readily conduct heat away from the photovoltaic panel such that the flexible tubing primarily cools the metallic backing sheet. In that regard, the U-channeling of the metallic backing sheet may be sized to enhance surface contact between the inner surface of the U-channeling and the outer surface of the silicone tubing thereby maximising thermal transfer therethrough.

Furthermore, in embodiments, the flexible tubing may be slightly pressurised such that the flexible tubing expands and more snugly accommodates the interior of the U-channeling between the metallic backing sheet and the photovoltaic panel.

Furthermore, the use of a flexible tubing, such as silicone tubing, is advantageously low-cost and furthermore provides a material which is generally none corrosive, light weight, flexible and temperature range resistant allowing for a long operational life. Furthermore, silicone tubing is not readily combustible, thereby reducing or eliminating potential fire hazard.

In further embodiments the heat exchanger is separated into at least one thermal cell. The thermal cells are defined by separation strips. In prior art systems the thermal conductivity of the tubing and metal sheet can be insufficient to keep the top of the heat exchanger cooler than the lower sections. Corporation of thermal cells produces heat transfer from movement of warm air within the heat exchange unit.

In a seventh aspect the invention provides a control system for a heat exchange system, the heat exchange system comprising a plurality of heat exchangers, a fluid path through the heat exchangers and a pump for creating fluid flow in the heat exchange system, the system comprising a plurality of sensors for providing system measurements to the control system, wherein the control system controls operating parameters for the heat exchange system in dependence on the system measurements.

Such embodiments control the state of the heat exchange system in dependence on the operating conditions.

In embodiments the sensors comprise at least one of temperature sensors, pressure sensor; or sonic flow meter.

In embodiments the operating parameters for the heat exchange system comprise at least one of flow rate of fluid in the heat exchange system, temperature of fluid in the heat exchange system, position of valves in the heat exchange system.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
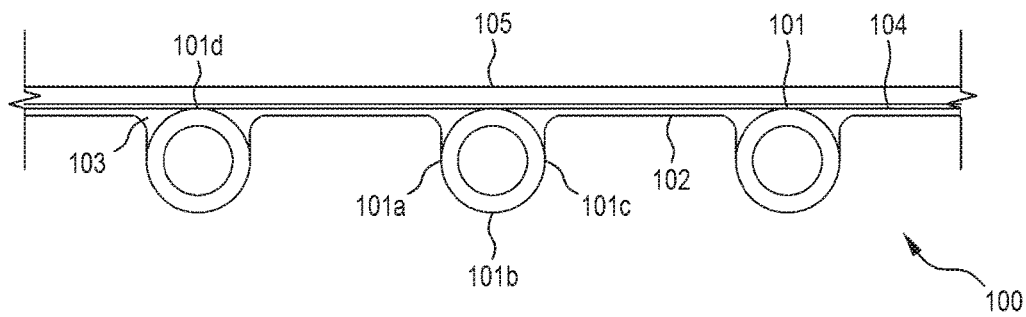
FIG. 1 shows a side elevation view of a solar thermal panel for a solar photovoltaic panel in accordance with an embodiment.

FIG. 1 shows a heat exchanger 100 for a solar panel 105. Heat exchanger includes backing plate 102. Backing plate includes U-channeling 103 depressed in an upper surface of the backing plate 102. The term U-channeling refers to the cross-sectional shape of the channels which is generally U-shaped. Other shaped channels could also be used. Tubing 101 is positioned within the U-channeling. In the embodiment of FIG. 1 tubing 101 is flexible.

In the embodiment of FIG. 1, the heat exchanger 100 backing sheet 102 is metallic. Furthermore, the flexible tubing is silicone tubing 101. The silicone tubing is reticulated within the U-channeling 103. Flexible tubing refers to any tubing that can be deformed to increase contact with a solar panel.

The diameter of the flexible tubing is selected to allow the flexible tubing 101 to sit within the U-channeling and make contact with the inside surface of the channel. As shown in FIG. 1 flexible tube 101 has a portion 101a in contact with a first side wall of the U-channel, a second portion 101b in contact with the lower surface of the U-channel and a third portion 101c in contact with a second side wall of the U-channel. The upper surface of the flexible tubing 101d extends to the top of the U-channel. The heat exchanger operates by providing a conduction heat path between the flexible tubing and the backing plate. Thus, the surface area of contact between the U-channel and the flexible tube is configured to be great as possible.

In embodiments, the flexible tubing 101 may be retained within the U-channeling 103 by way of an adhesive foil 104 laid across the flexible tubing 101 within the U-channeling 103. In a preferred configuration, the upper surface of flexible tubing 101d is brought into contact with the adhesive foil. Again, the conduction path between the flexible tubing and the adhesive foil facilitates heat exchange between the two surfaces.

As can be appreciated from FIG. 1, the heat exchanger 100 is configured to be positioned against a rear surface of the solar photovoltaic panel 105. In use, the solar photovoltaic panel 105 is brought into contact with backing plate 102. In the embodiment of FIG. 1 in which adhesive foil is provided across the openings of the u-channels, the solar photovoltaic panel 105 is brought into direct contact with the adhesive foil. Heat exchange is facilitated via the surface contact. The flexible tubing 101 is located between the solar photovoltaic panel 105 and the metallic backing sheet 102.

The flexible tubing is configured to carry fluid. In preferred embodiment the fluid is a liquid but in some systems other fluids may be used. The system provides a heat exchange between the fluid within the flexible tube and the solar photovoltaic panel. As will be clear from the configuration shown in FIG. 1, the heat exchange path runs from the solar photovoltaic panel to the adhesive foil or to the backing plate or directly to the flexible tube (depending on position and configuration) by physical contact. The heat exchange path continues to the flexible tube via the contact between the flexible tube and the U-channeling.

Depending on the relative temperatures of the fluid within the flexible tubing and the solar photovoltaic panel, heat can be transferred from the solar panel to the fluid or from the fluid to the solar panel.

As such, in a first example the solar photovoltaic panel is at a temperature higher than the fluid, for example in a hot environment in direct sunlight. In this example, the metallic backing sheet 102 conducts heat away from the solar photovoltaic panel 105 and into the fluid within the flexible tubing 101. In this case the fluid is a coolant. In cold conditions, for example when snow has accumulated on the solar photovoltaic panels, warm fluid can be pumped around the flexible tubing to transfer heat to the solar photovoltaic panels via the backing plate to increase the temperate of the solar voltaic panel, for example to melt the snow and expose the solar photovoltaic panel to sunlight.

Dimensions of the heat exchangers can vary depending on the size of the solar photovoltaic panels. Typical dimensions of the backing plate are 940 mm wide by 1600 mm long.

In embodiments, the metallic backing sheet 102 may be cut and pressed in a low-cost cut-and-press mass production process. Furthermore, in embodiments, channels 103 may be shaped so as to allow the stacking of the metallic backing sheets 102 together in preproduction during storage, reducing the space occupied thereof for facilitating transportation.

In embodiments preferred physical characteristics of the metallic sheet include high thermal conductivity. Further preferred characteristics are lightweight. In preferred embodiments, the metallic backing sheet 102 may be manufactured from aluminium. Furthermore, aluminium foil 104 may be adhered across the upper surface of the metallic backing sheet 102. Aluminium provides a high thermal conductivity at a light weight.

As discussed above, in a preferred embodiment, the U-channeling 103 is sized so as to maximise the contact surface area between the exterior surface of the silicone tubing 101 and the interior surface of the U-channeling 103.

In embodiments, the fluid within the silicone tubing 101 may be pressurised so as to cause the silicone tubing 101 to expand to press against the interior surfaces of the U-channeling 103 and to fill the interstices between the inner surfaces of the channels 103 and the rear surfaces of the solar photovoltaic panels 105. This increases the contact surface area between the flexible tubing and the U-channeling to improve heat exchange.

Figure 2:
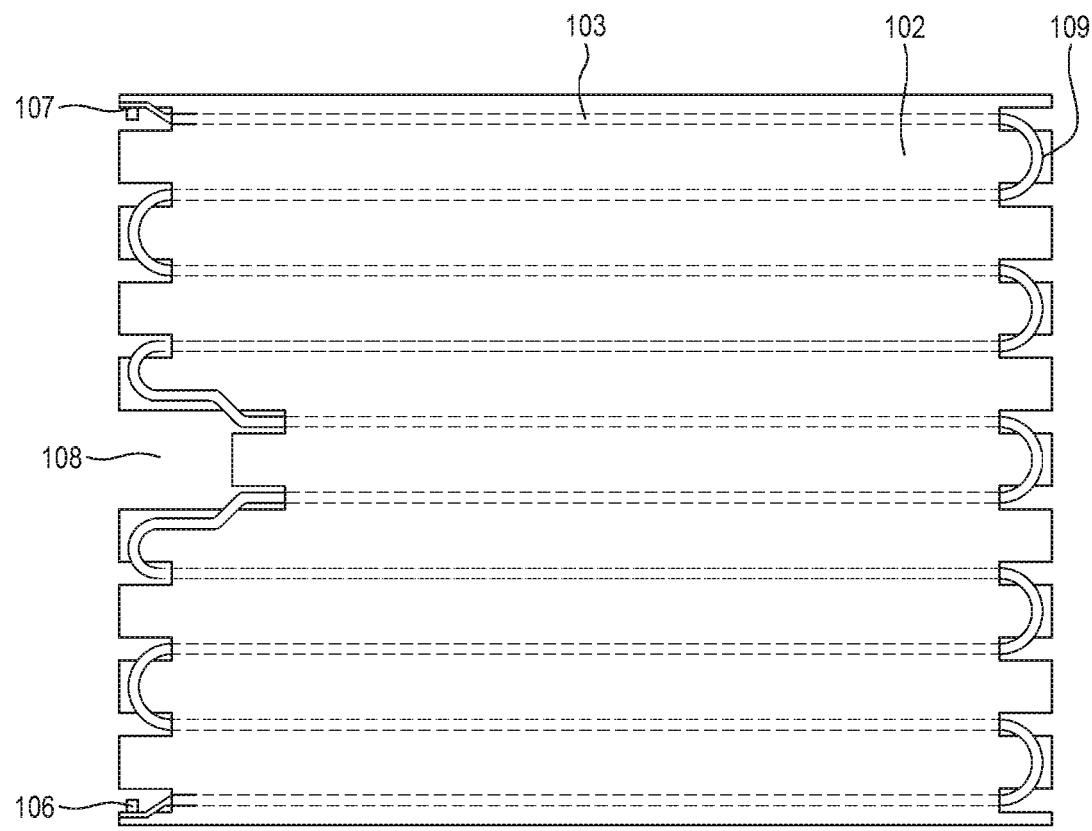
FIG. 2 shows a rear plan view of the solar thermal panel adhered to a rear surface of the solar photovoltaic panel in accordance with an embodiment.

FIG. 2 illustrates a rear plan view of the solar thermal panel 100 adhered to a rear surface of the solar photovoltaic panel 105.

As shown in FIG. 2, flexible tubing 101 is arranged to form a single fluid path through the backing plate from an inlet 106 to an outlet 107. As can be seen, channels 103 are formed such that the silicone tubing 101 is arranged in a plurality of parallel runs with edge loops 109 extending outside the U-channeling joining adjacent parallel runs. In embodiment shown, the flexible tubing 101 takes 10 parallel runs substantially equidistantly across the metallic backing sheet 102. Furthermore, an even number of parallel runs may be utilised such that the inlet 106 and the outlet 107 may take off from the same edge of the solar thermal panel 100.

Furthermore, the parallel runs may be spaced apart, such as by approximately 10 cm, such that edge loops 109 of the silicone tubing 101 comprises sufficient radius to eliminate or reduce kinking and/or construction.

In typical embodiments, most of the length of the flexible tubing sits within the U-channeling and a small portion is located outside the backing plate in the edge loops. For example, in a backing plate having dimensions of 940 mm by 1600 mm the total length of flexible tubing is around 16 m, of which around 15 m is positioned within the U-channels. In order to improve the efficiency of heat transfer further, edge loops 109 may be wrapped with metal foil. The foil may be connected to backing plate to assist heat exchange with fluid within edge loops 109.

Furthermore, FIG. 2 illustrates the metallic backing sheet 102 sized and shaped so as to conform substantially to the rear surface of the solar photovoltaic panel 105. In the embodiment shown, the metallic backing sheet has reduced length so as to allow space for the edge loops 109 to be accommodated entirely under the solar photovoltaic panel 105.

Furthermore, there is shown the metallic backing sheet 102 comprising a cut out to accommodate the junction box 108 of the solar photovoltaic panel 105.

In typical manufacture processing the U-channeling is pressed into the aluminium backing sheets. Having the channels arranged in a parallel configuration facilitates stamping. Other configurations of channels are possible, for example by using specific alloys and hot stamping techniques; bends may be formed in channels at the end of the panel. As such, in some embodiments the backing plate includes curved edge loops to receive the edge loop portion of flexible tubing.

Figure 3:
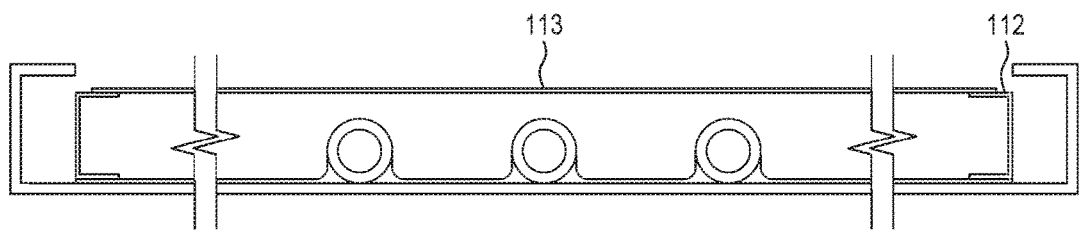
FIG. 3 illustrates the utilisation of a rearward insulation sheet in accordance with an embodiment.

FIG. 3 illustrates an embodiment wherein a rearward rear panel 113 is utilised at a rear surface of the metallic backing sheet. In accordance with this embodiment, the rearward rear panel 113 may slide within rear edges of a C-shaped frame 112.

The rear panel 113 may retain heat at lower temperatures around the metallic backing sheet 102, thereby increasing cooling efficiency. If internal temperatures increase excessively, for example in a situation where the pump is not running (i.e. there is no flow of fluid around the heat exchange unit) on a hot day, then the metallic rear panel acts as a heat sink, allowing heat to dissipate through the rear of the exchange panel. This prevents fluids within the tubing from boiling. Boiling can result in over pressurising the system and ultimately failing.

In some embodiments different materials or combinations of materials may be used for the rear plate to optimise the properties of the rear plate.

Figure 4:
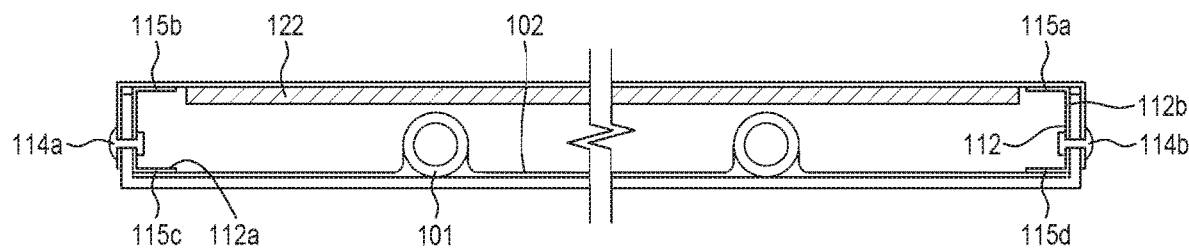
FIG. 4 illustrates a cross-sectional view of a heat exchange unit.
Figure 5:
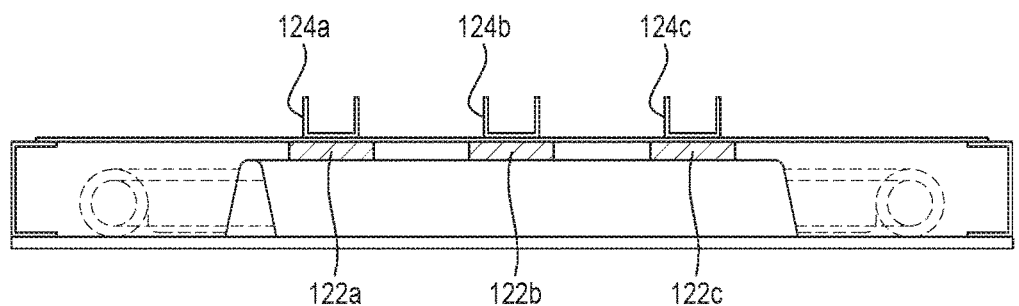
FIG. 5 illustrates a cross-sectional view of a heat exchange unit.

This embodiment of FIG. 3 provides a heat exchange unit which is configured to attach to a solar photovoltaic panel. The embodiment is shown in greater detail in FIGS. 4 and 5. In the embodiment of FIG. 4 frame 112 is shown extending around the periphery of the heat exchange unit. Typically, the frame 112 is made from a lightweight, strong material. Preferred embodiments may be aluminium. In FIGS. 4 and 5 the frame has a C-shaped cross section. As shown in the cross-sectional representation in FIG. 4 backing plate 102 is outside C-shaped frame 112. Backing plate 102 has extended side sections 102*a* 102*b* which extend at an angle to the backing plate 102 and along the outside of frame 112. This arrangement positions C-shaped frame on the inside of backing plate 102 and within the heat exchange unit. On the opposite side of the heat exchange unit, rear panel 113 also extends around the C-shaped frame. Rear panel has extended side section 113*a* 113*b* which extend at an angle to rearward rear panel 113 and around the outside of frame 112. Preferably the side portions of backing plate 112*a* 112*b* overlap with the respective side portions of rear panel 113*a* 113*b*.

In the embodiment of FIG. 4 the heat exchange unit is fixed together using rivets 114*a* 114*b* which hold the C-shaped frame to the side portions of the backing sheet and rear panel.

In further embodiments the end portions of the backing plate and rear panel may not over, and separate rivets may be used to fix the backing plate to the C-shaped frame and to fix the rear panel to the C-shaped frame.

In the embodiment of FIG. 4 adhesive 115*c* 115*d* is provided between backing sheet and C-shaped frame. Adhesive 115*a* 115*b* is provided between rear panel 113 and C-shaped frame 112. Preferred properties for the adhesive are that it is heat tolerant to greater than 100 degrees C. and that it provides some thermal insulation between the backing panel and the frame.

Insulating strips 122*a* 122*b* 122*c* are positioned on the inside of the heat exchange unit between U-channels 103 and rear panel 113. Depending on the material used, insulating strips 122*a* 122*b* 122*c* provide structural support to the heat exchange unit. Insulating strips 122*a* 122*b* 122*c* are used as spacers to prevent contact between channels 103 of backing plate and the rear panel. This configuration avoids a direct contact between the channels of the backing plate and the rear panel, avoiding a mechanism for excessive heat leakage from the heat exchange unit. Preferred material for the insulating strips includes PVC foam.

Insulation strips 122*a* 122*b* 122*c* can additionally be used as preferred fixing points for fixing bars 124*a* 124*b* 124*c* when the heat exchange unit is positioned with a solar photovoltaic panel.

Figure 6:
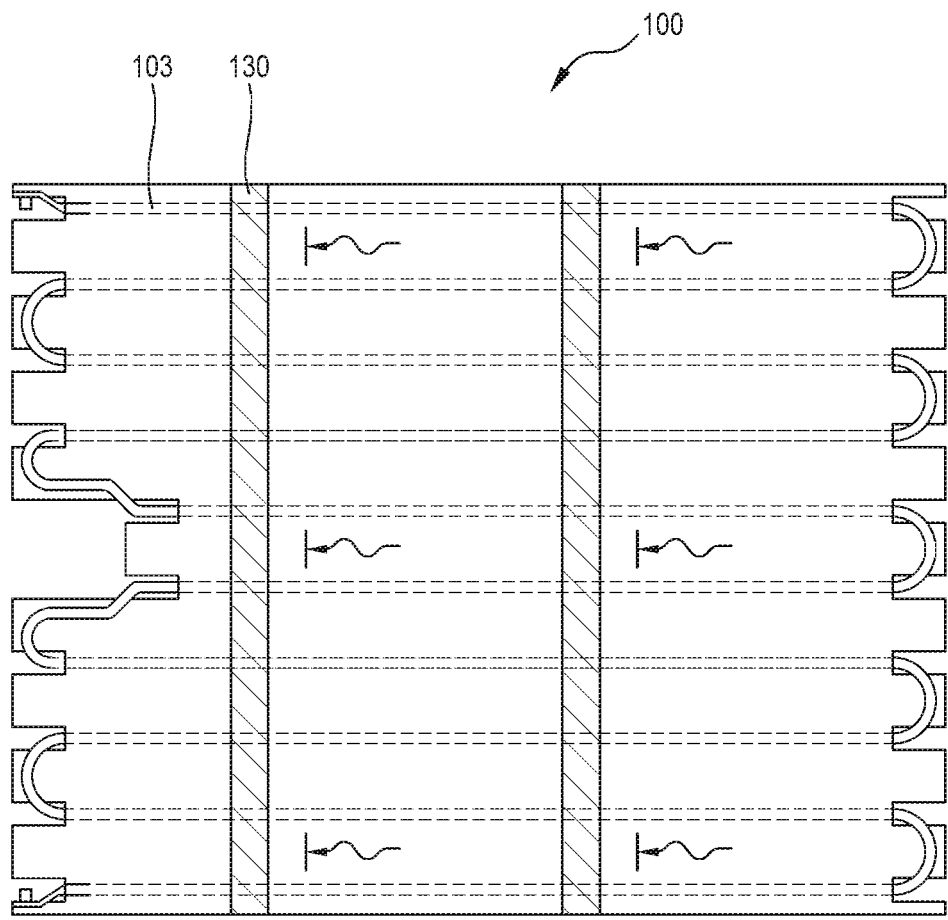
FIG. 6 illustrates a heat exchange unit including thermal cells.
Figure 7:
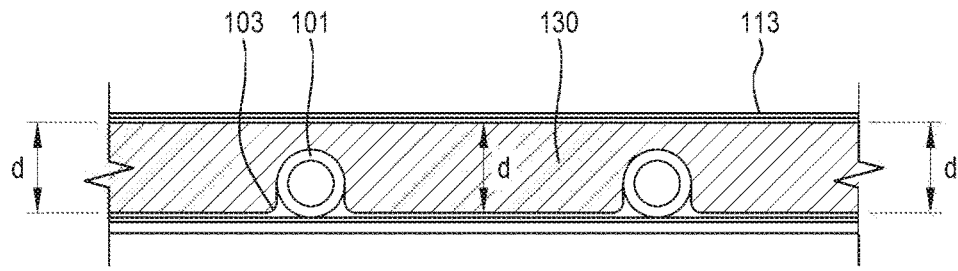
FIG. 7 illustrates a heat exchange unit including thermal cells.
Figure 8:
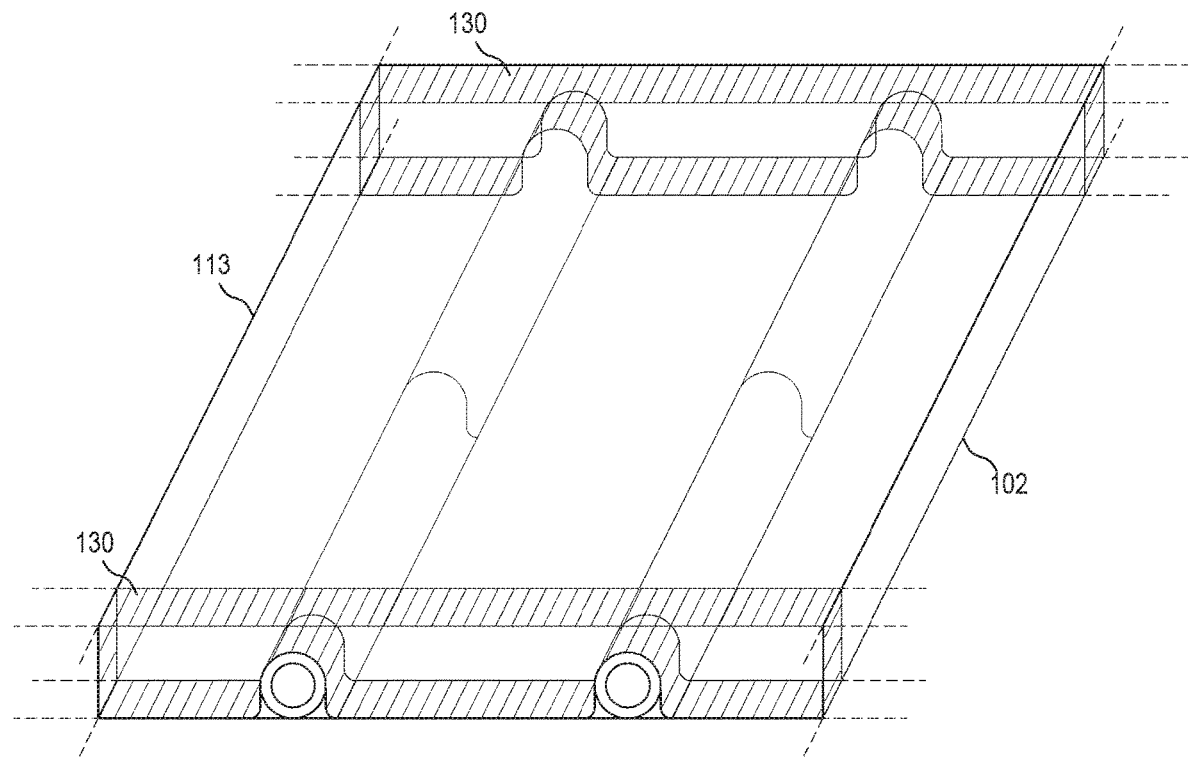
FIG. 8 illustrates a perspective view of a thermal cell within a heat exchange unit.

An additional feature of embodiments of the invention is thermal cells created within the heat exchange unit, as shown in FIGS. 6, 7 and 8. Thermals cells contain radiated heat within defined portions of the heat exchange unit.

FIG. 6 is a cutaway portion of heat exchange unit. Separation strips 130 are included within heat exchange unit between the backing plate and rear panel 113. As shown in FIGS. 7 and 8 separation strips 130 are laid across the channels. Preferably, the separation strips extend across the width of the heat exchange unit and extend throughout the depth 'd' of the heat exchange cell. As shown in FIG. 7, separation strips include cutaway portions 132 to receive channels 103. Preferred materials for the separation strips include foam or other low-density insulation materials.

The separation strips create thermal barriers to prevent movement of air along the heat exchange unit. Movement of warm air can be a particular problem when heat exchange units are arranged at an angle, for example on an angled roof of a house. In this arrangement, warm air tends to rise to the highest point within the heat exchanger. This creates a temperature gradient across the heat exchange unit which affects the cooling or warming properties of the heat exchanger against the solar photovoltaic cell. Thermal cells trap heat within the cells. This increases the efficiency of the heat exchange unit and also improves the performance of the solar photovoltaic panel to which it is attached. The separation strips create a thermal barrier and separates the thermal cells to prevent all heat in the heat exchange unit rising to the highest point.

When the separation strips are in place, they provide additional structural support to the heat exchange unit and can provide additional support to the back of the heat exchange unit and help improve contact to the solar photovoltaic panel.

The number of separation strips and the distance between the separation strips is dependent on the dimensions of the panel.

In embodiments, separation strips are placed in line with fixing bars 124 to provide maximum purchase against the photovoltaic cell.

Figure 15:
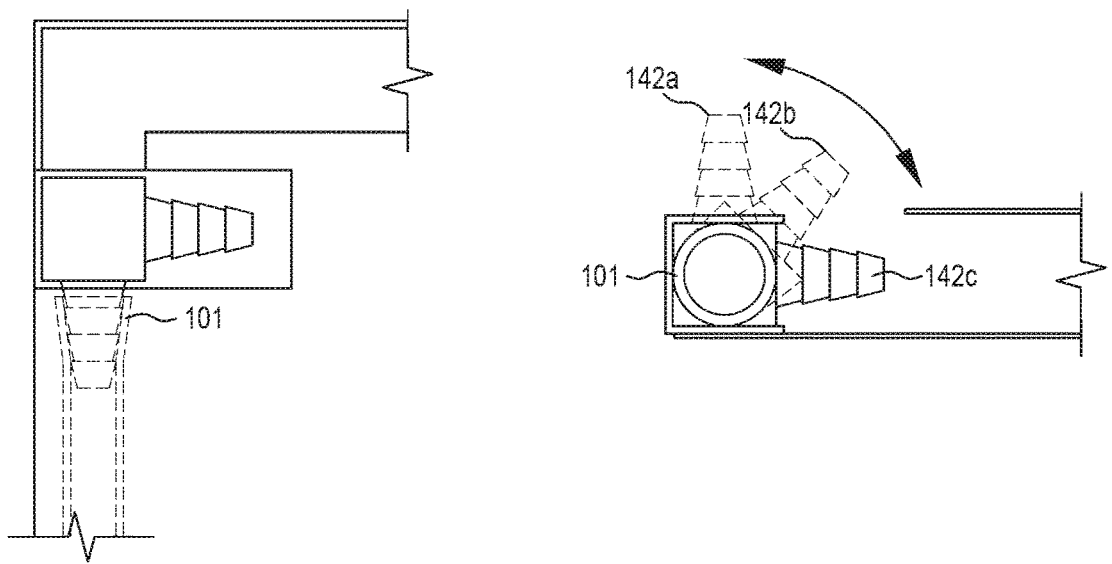
FIG. 15 illustrates a connector for a heat exchange unit.

Inlet 106 and outlet 107 are now described with reference to FIG. 15. Inlet 106 and outlet 107 are connected to flexible tubing 101. Preferably inlet 106 and outlet 107 extend at an angle to flexible tubing 101 and rotate into the plane of the heat exchange unit (position (a)) and out of the plane of heat exchange unit (position (c)) via intermediate position (position (b)). Preferably inlet and outlet have connection nozzle 142 have a generally coned configuration. Connection nozzle 142 includes at least one circumferential barb. To improve sealing.

Figure 10:
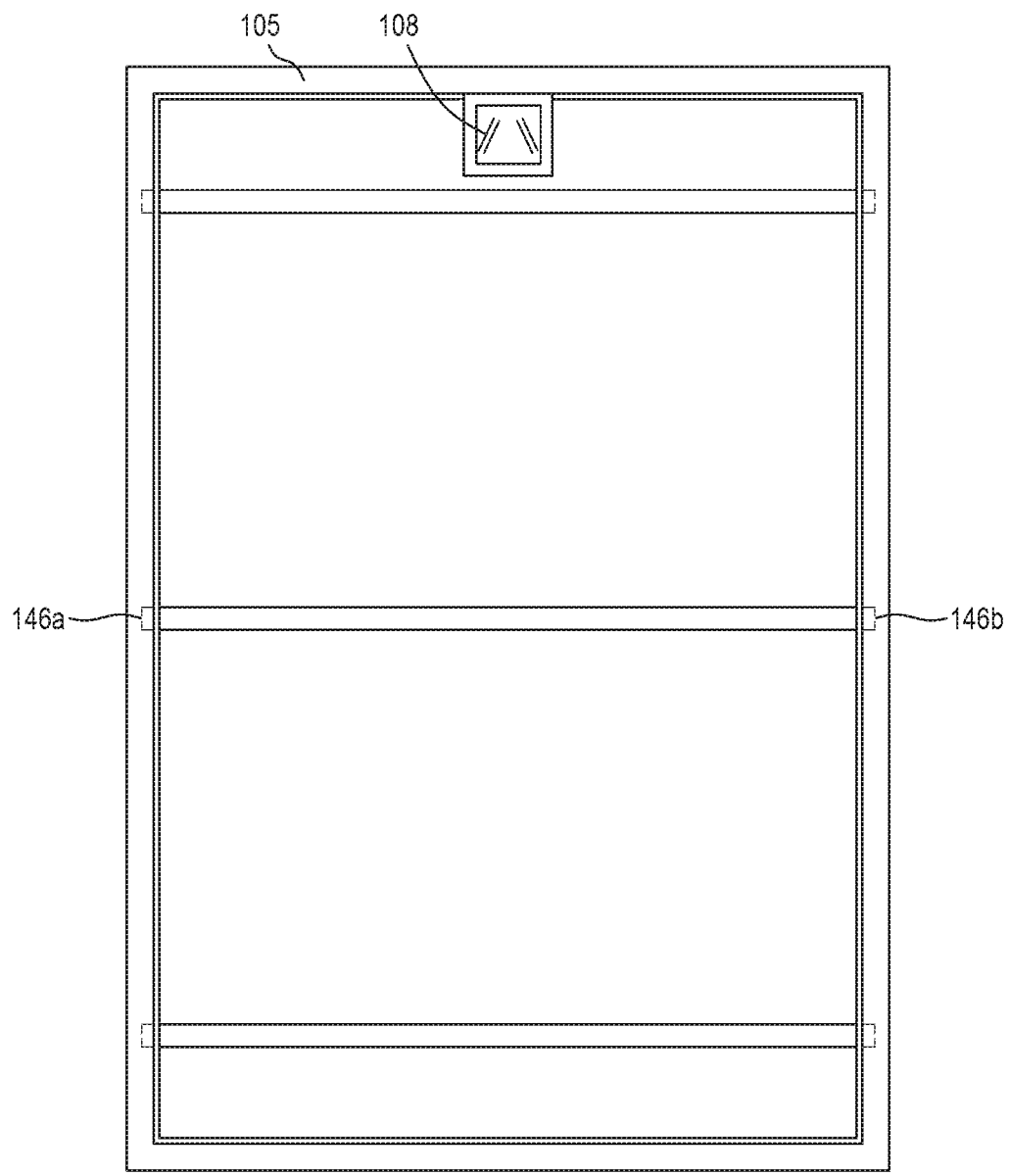
FIG. 10 illustrates the affixation of the solar thermal panel to the solar photovoltaic panel utilising affixation bars in accordance with an embodiment.

FIG. 10 illustrates a manner of affixation of the solar thermal panel 101 against the rear surface of the solar photovoltaic panel 105. In accordance with this embodiment, the solar photovoltaic panel 105 may comprise a peripheral frame 142. In this regard, transverse affixation bars 110 may span between opposite edges of the peripheral frame 112 and may be affixed thereto within predrilled holes 101 within the frame 112.

The transverse affixation bars 110 hold against the rear surface of the metallic backing sheet.

Figure 9:
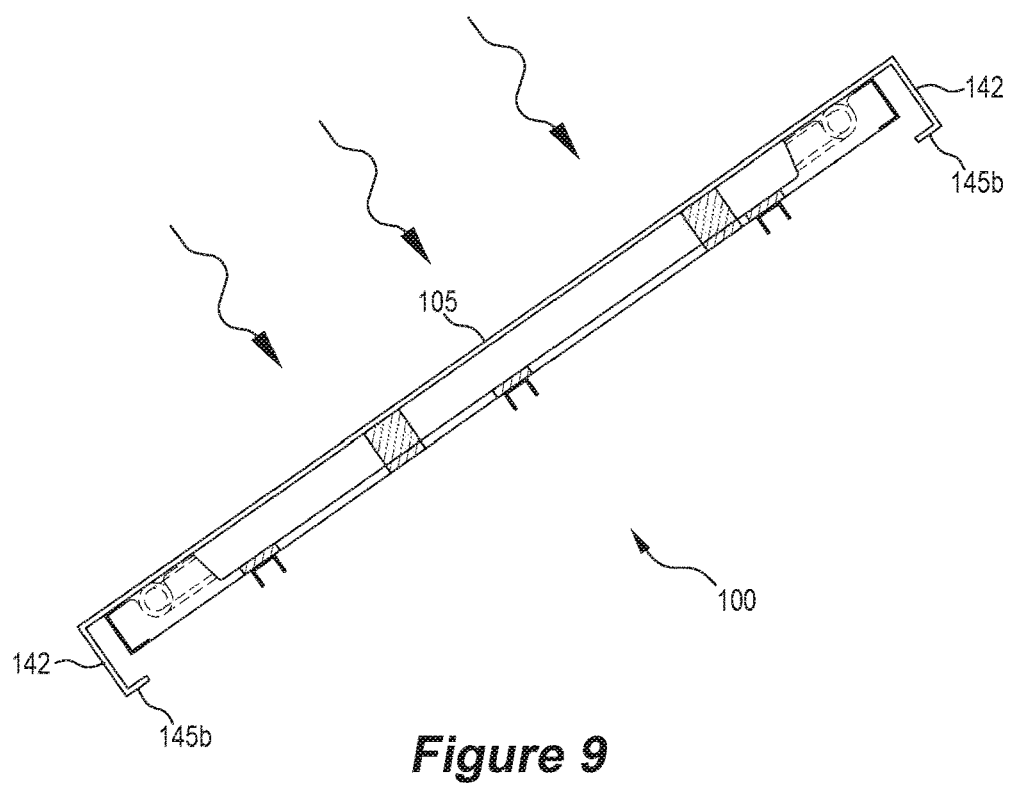
FIG. 9 illustrates a heat exchange unit installed in a solar photovoltaic panel.

FIG. 10 illustrates transverse affixation bars 110, wedged between the heat exchange unit and the frame of photovoltaic panel 146a 146b FIG. 9 shows a cross-sectional view of the heat exchange unit in position within photovoltaic panel 105. Frame 142 includes underside lip portions 145a 145b. Part of heat exchange panel 100 can be positioned under lip 145a or 145b.

Figure 16:
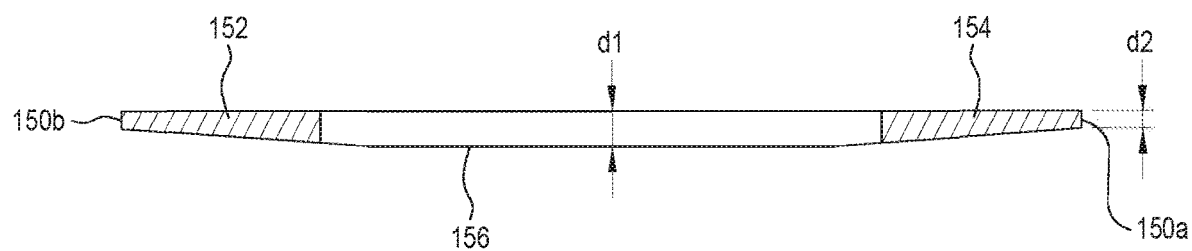
FIG. 16 illustrates a fixing bar.

An example of affixation bar 156 is shown in more detail in FIG. 16. Affixation bar has an angled cross section. This creates a change in depth of the affixation bar across the width of the affixation bar. In the example of FIG. 16 the depth of the affixation bar is smallest at end points 150a 150b 'd2' and greatest around the centre point d1. This configuration enables end portions 152 154 to be wedged between the heat exchange unit and the frame of solar photovoltaic panel 146a 146b. The angled surface of the affixation bar 156 is placed in contact with the heat exchange unit. The change in depth creates a spring effect to press the affixation bar into the heat exchange unit and improve purchase of the backing plate onto the solar photovoltaic panel.

There are several factors and considerations in the design and materials used in the heat exchange unit. As discussed above, the thermal conductivity between solar photovoltaic panel and the heat exchange unit is important in order to efficiently manage heat exchange between the solar photovoltaic panel and the fluid carried in the flexible tubing. Heat loss from the rear panel should also be managed through separation strips. The overall weight of the heat exchange unit is also a factor in the design. As described above, the heat exchange units are retrofitted to solar panels. The solar photovoltaic panels are often positioned on rooftops of houses and other buildings. Weight can be a consideration for ease of installation and also a consideration for the strength of the supporting structure or roof. Weight varies depending on the size and requirements of the heat exchange units. Typical weight for a heat exchange unit having an aluminium backing plate, elastomer tubing and aluminium rear panel is around 6 to 8 kg.

Examples of panel specifications are shown in Table 1:

TABLE 1

| Panel specifications | |
|---|---|
| GENERAL DATA | |
| Length * | 1600 mm |
| Width * | 940 mm |
| Fits PV frame thicknesses | 35 mm-45 mm |
| Weight empty/filled | 6.5 kg/7.52 kg |
| Unit colour | Metallic/Blue |
| Panel thickness | 17 mm |
| THERMAL DATA * | |
| Gross area | 1.4784 m$^2$ |
| Volume of heat transfer liquid | 1.02 L |
| Maximum temperature[1] | 83° C. |
| Maximum operating pressure | 2.0 bar |
| Pressure loss per panel | 23 kPa at 200 litres/hour |
| Hydraulic input/output | 10 mm fitting |
| Measured output/m$^2$ at 25 C.[#] | 570 watts |
| Measured output/panel at 25 C.[#] | 900 watts |

[1]Stagnation temperature on 39 C. day
[#]Water temperature entering panels

Heat exchange units can be retrofitted into solar photovoltaic panels and existing solar photovoltaic systems. The independent configuration of each heat exchange unit, having a separate fluid input and output, provides versatility in system design and enables heat exchange units to be connected in a modular configuration into a heat exchange system.

Figure 11:
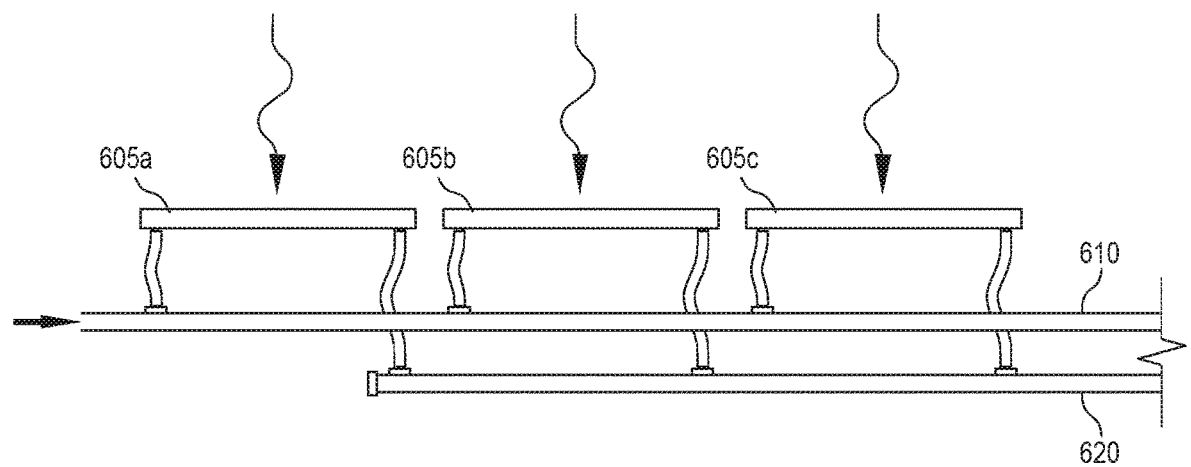
FIG. 11 illustrates a heat exchange system.

FIG. 11 shows an illustration of a heat exchange system 600. Heat exchange system 600 includes heat exchange units 605a 605b 605c. Each heat exchange unit is attached to a solar photovoltaic panel (not shown). Heat exchange units are connected in parallel configuration within the fluid line. Fluid is delivered to the heat exchange units via manifold 610 and extracted from the heat exchange units via manifold 620.

Manifolds 610 and 620 are part of a closed loop circular fluid system including a pump. In an embodiment, water coolant may be utilised which may be pumped through the heat exchange system. The heat exchange system may comprise an electric pump which pumps water through manifold 610 to heat exchange units for heating and out via an outlet of each heat exchange unit, along manifold 620 which then flows direct into an insulated heated reservoir or heats the insulated heated reservoir by way of thermal exchange coils.

In embodiments, the heat exchange system may comprise temperature sensors for monitoring the temperature (or thermal conversion efficiency) of the solar photovoltaic panel or the heat exchange units. The pump may be controlled in response to the temperature measurements so as to provide coolant or adjust the rate of coolant flow according to temperature/electrical conversion efficiency.

The heat exchange system may include sensors for measuring the temperature of the water at various locations within the system. In some systems, temperature sensors are positioned at the heat exchange unit. The sensors may be positioned at the inlet or outlet of the heat exchange unit. Sensors may also be positioned on the solar photovoltaic panels to measure the temperature of the solar photovoltaic panels. The temperature sensors along with a sonic flow-meter detect and report the thermal energy produced by the system.

In some systems, these sensors provide data to a Programmable Logic Controller (PLC) computer that controls the pump and valves. During low temperature days when the solar photovoltaic panels are at a temperature range at which they operate at acceptable efficiency, the pump speed and therefore energy requirement can be reduced, or completely stopped. In warmer environments when the solar photovoltaic panels increase to a temperature at which they operate with lower efficiency the speed of the pump can be increased, thereby increasing the water flow and cooling the panels more effectively.

Pressure sensors can be placed in the pipe system. In a situation where there is an obstruction in the pipework and the pressure increases, such as a valve has been left closed, the PLC will turn the pump off to prevent any damage to the pipework.

The temperature sensors along with a sonic flow-meter detect and report the thermal energy produced by the system. All information can be reported to a (cloud based) user interface through IIOT. The system can be programmed to monitor temperature, pressure of other measurements against predefined values. When those predefined values are reached alarms can be triggered or the system can be initiated or performance changed.

In embodiments, the solar thermal water heating system may be controlled to heat water during the day but to dissipate heat during the cooler night (such as for air conditioning or the like) by pumping warm water through the silicone tubing 101. In further embodiments, the heat exchange system may pump warm fluid around the heat exchange units to warm the solar photovoltaic panels, for example if snow or frost is obscuring the solar photovoltaic panels.

Figure 17:
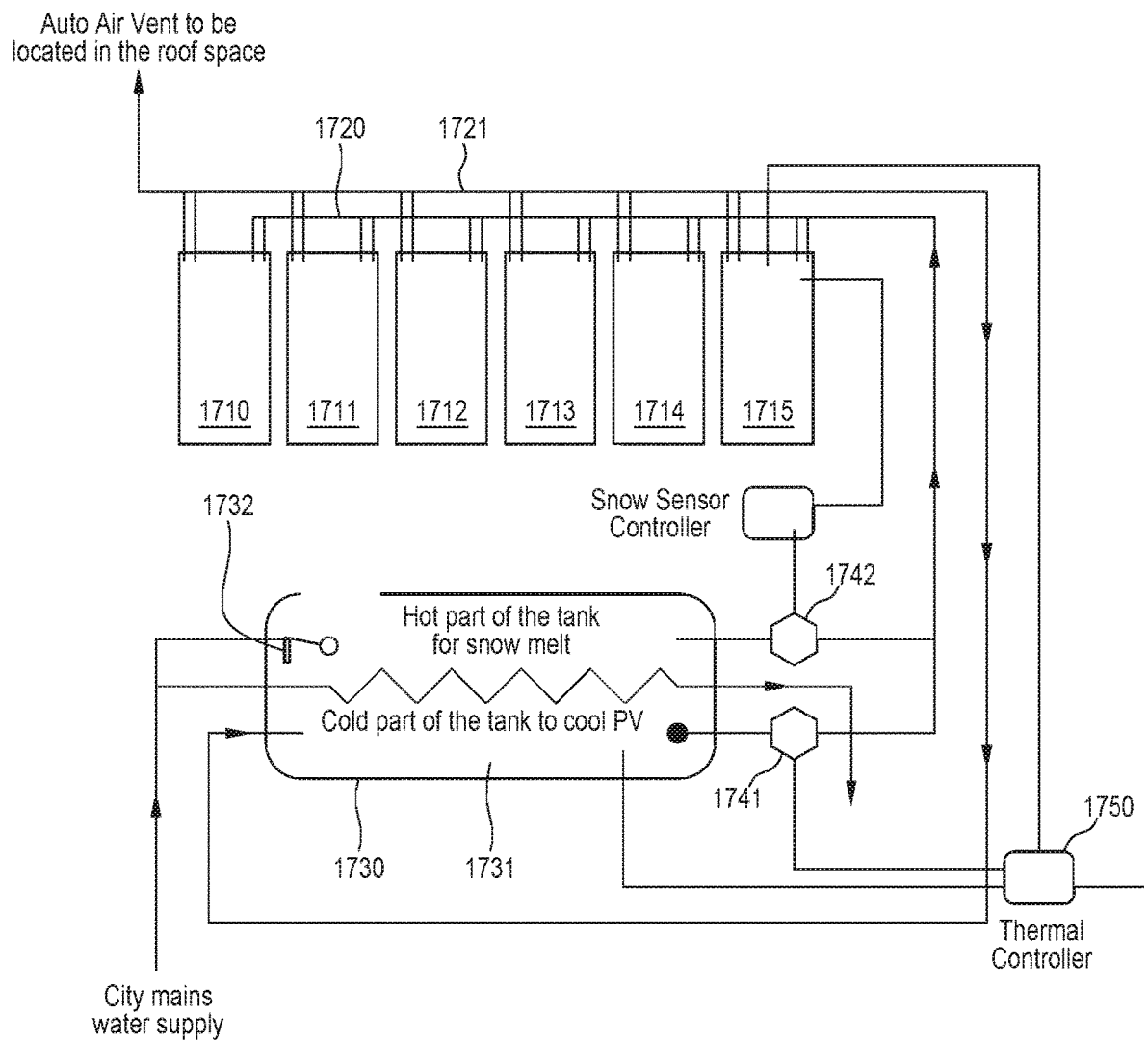
FIG. 17 illustrates a system schematic.

FIG. 17 shows the architecture for a heat exchange system. The system includes heat exchange units 1710 1711 1712 1713 1714 1715 each attached to a solar photovoltaic panels (not shown). In FIG. 17 the closed loop fluid circuit includes an inlet manifold 1720 and an outlet manifold 1721 for carrying fluid into and out of the heat exchange units. The manifolds are connected to tank 1730. In the example of FIG. 17 a thermally insulated, open vented tank 1730 has one compartment 1731 where water stratifies, with the warmer water rising to the top of the tank, colder water sinking to the bottom of the tank. Water for cooling the heat exchange units would generally be taken from the cooler lower section of the tank. To quickly melt snow, water could be taken from the warmer upper section of the tank. Further embodiments may include one heat exchanger coil 1732 or multiple heat exchanger coils within the tank. Warm water from this system could be used for uses such as hydronic (underfloor) heating or to preheat water before it enters a boiler.

The system includes pumps 1741 1742 to create fluid flow around the system.

The system is controlled by PLC computer 1750. PLC computer controls the pumps and also valves within the system to optimise performance of the system. Temperature sensors, for solar panels and water temperature, and pressure sensors, are distributed around the system. These sensors are connected to PLC computer. PLC computer controls the pumps and the flow rates created by the pumps based in dependence on the measurements from the sensors. For example, if the solar photovoltaic panels are too hot, flow rate of cool fluid may be increased.

Accurate temperature sensors (+−0.1 C) are fitted to the system at various locations including the heat exchange units, the inlet and outlet pipes. These sensors provide data to the PLC computer that controls the pump and valves. During low temperature days the pump speed and therefore energy requirement can be reduced, or completely stopped, on warmer days the speed of the pump can be increased, thereby increasing the water flow and cooling the panels more efficiently.

Pressure sensors can be placed in the pipe system. In a situation where there is an obstruction in the pipework and the pressure increases, such as a valve has been left closed, the PLC can monitor pressure against predetermined criteria and turn the pump off to prevent any damage to the pipework.

Figure 13:
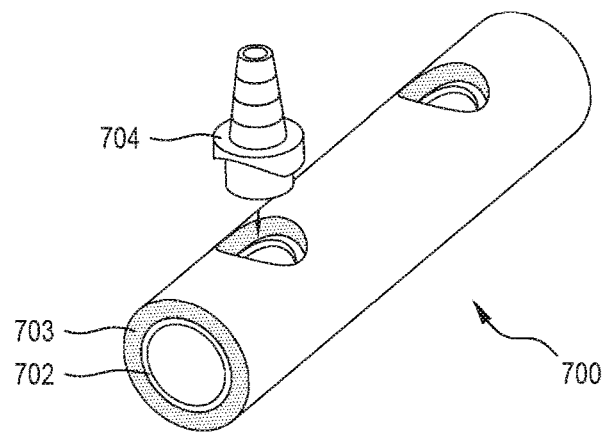
FIG. 13 illustrates manifold.
Figure 14:
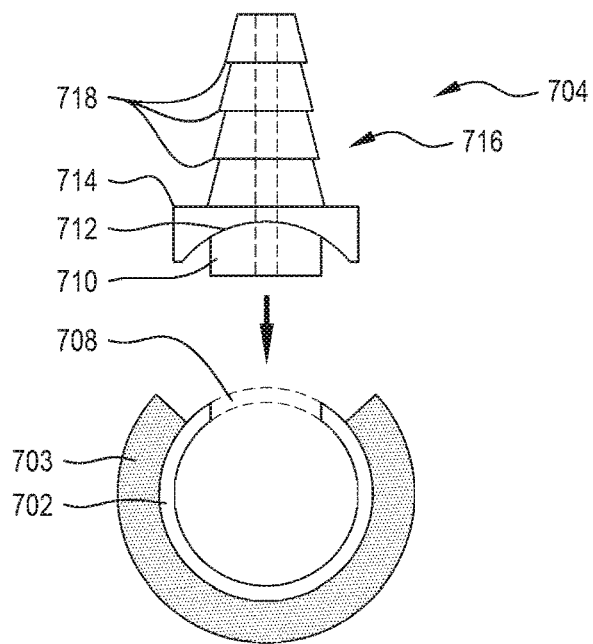
FIG. 14 illustrates an exploded view of a pipe and connector.

FIG. 13 shows an illustration of the manifold system 700. Manifold system includes pipe 702, insulation material 703 and saddle barb fitting 704. An extended manifold system could include multiple saddle barb fittings along its length in an inline configuration. The saddle/barb fitting is shown in greater detail in FIG. 14. Saddle barb fitting 704 has engagement portion 706. Cylindrical engagement portion has suitable dimensions to engage opening 708 in pipe 702. Preferably the engagement portion 706 and pipe 702 have a circular configuration. Other configurations and shapes may also be used. The depth and shape of engagement portion 706 is configured to match the wall of pipe 702. When saddle barb fitting is installed into pipe 702 the underside of engagement portion 710 matches the contours of the inside of tube 702. This arrangement provides a smooth inside surface to pipe 702. This design helps to minimise turbulence within the fluid in pipe 702 by reducing flow resistance. Pipe insulation material can be synthetic rubber sheaths, such as EPDM, which generally have some UV resistance.

Saddle barb fitting 704 includes saddle portion 714. The underside 712 of saddle portion 714 is configured to match the angle and contour of the outside surface of pipe 702.

Nozzle 716 projects from saddle portion 714. Nozzle 716 has a generally conned configuration in which the outer diameter of the nozzle reduces as it extends away from the saddle portion 714.

Nozzle 716 includes barbs 718 extending circumferentially around the nozzle. The barbs provide stability during connection and increase the sealing performance of the nozzle. Preferred materials for the manifold fittings and pipes are polyethylene (PE) or UV protected polypropylene random copolymer (PPR).

During installation, saddle barb fittings are fusion welded to pipe 702. A hole is pre-drilled into the insulation and then the main pipe, then using a tool, the hole and the saddle barb fitting are heated up simultaneously, before being pushed together. This process can be automated and the barb fittings pre-installed on the lengths of manifold pipe to ease and speed up installation.

During installation opening 708 may be drilled into pipe 702, should the system design necessitate it. This provides flexibility in system design by allowing the position of saddle barb fittings to be selected on the pipe during installation.

Figure 12:
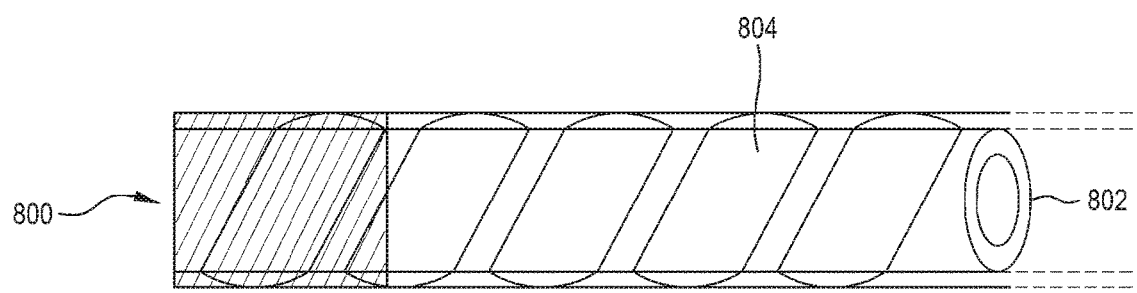
FIG. 12 illustrates a connector tubing.

Manifolds are connected to heat exchange units via connection tubing. An embodiment of the connection tubing is illustrated in FIG. 12. Preferably the connection tubing comprises flexible tubing. Examples of suitable materials include silicone tubing or EPDM tubing. After installation, the connection tubing is typically exposed to the natural elements. Spiral wrap 804 is provided around flexible tubing 802 to provide strength and insulation. Preferred materials for the spiral wrap include polypropylene.

In the embodiment of FIG. 12, heat shrinks are positioned over the spiral wrap at the ends of the connection tubing. Heat shrinks provide elastic inward force to the ends of the connection tubing to increase pressure on the connection joint after connection and so to improve the seal of the connection.

Figure 18:
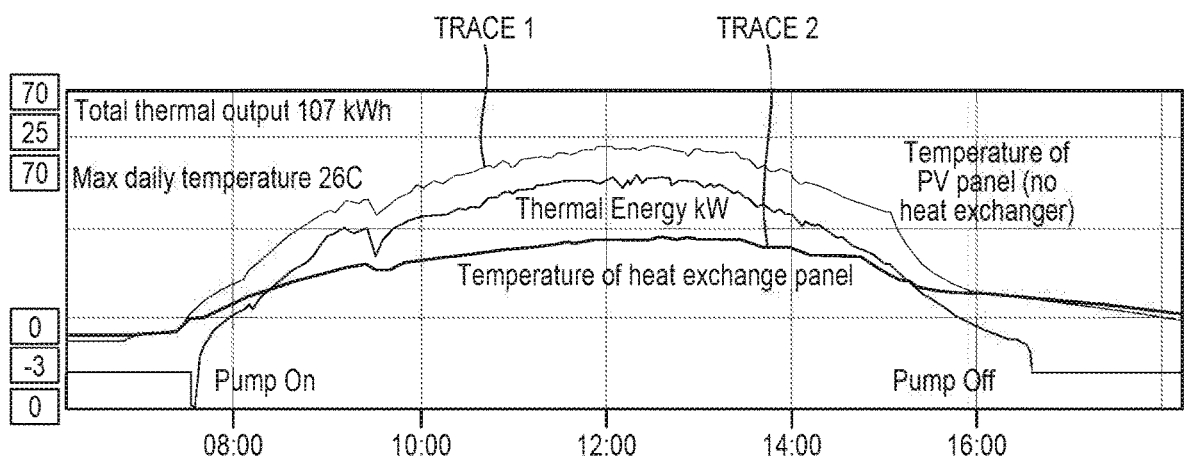
FIG. 18 shows the performance of a heat exchange system.

FIG. 18 shows the temperature of solar photovoltaic panels in a heat exchange system. Trace 1 shows the temperature in a solar photovoltaic panel not including a heat exchanger. Trace 2 shows the temperature in a solar photovoltaic panel including a heat exchanger. Both panels were exposed to the same environmental conditions and the temperature measurements were taken simultaneously. As shown in FIG. 18, heat exchange unit reduces the temperature of the solar photovoltaic cell throughout the test. Due to the relatively high water temperature of 24 C and low ambient temperature of 26 C, performance of the photovoltaic cells was measured to increase by approximately 4% during the test of this early prototype.

Embodiments of the present invention provide a flexible heat exchange system. The heat exchange units can be retrofitted to existing solar photovoltaic panels or installed during the solar panel installation process.

Embodiments of the heat exchange units include design features and combinations of materials which improve efficiency of heat exchange and performance of the heat exchange unit. Embodiments enable material selection to provide a lightweight heat exchange unit which eases transportation and ease of installation for units which have to be carried to elevated areas for installation, for example the roof of a house or other building.

The manifold system and quick fit connections using saddle barb fittings provides opportunity for flexibility in system design and configuration.

Embodiments of the heat exchange unit can be fitted behind most photovoltaic panels in a matter of minutes and it dramatically changes the way we can harness the sun's energy. Not only does the panel harvest the heat from the sun, through the PV panel, but also cools the PV panel down making it up to 15% more efficient.

Embodiment of the invention include no metallic components in contact with the transfer fluid so chlorinated water or salt water have a negligible impact on the system. This allows pool water to be used in systems close to swimming pools.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A heat exchanger for a solar photovoltaic panel comprising:
   a backing plate comprising U-channeling depressed in an upper surface thereof; and
   flexible tubing positioned within the U-channeling configured to carry fluid;
   wherein the heat exchanger is configured to be positioned in thermal contact with the solar photovoltaic panel, and, when the heat exchanger is positioned in thermal contact with the solar photovoltaic panel, the flexible tubing is retained between the U-channeling of the backing plate and the solar photovoltaic panel to facilitate heat exchange between the flexible tubing and the solar photovoltaic panel,
   wherein the U-channeling is configured to provide contact surface area between a surface of the U-channeling and a surface of the flexible tubing, the U-channeling having a rounded base and an opening having a width greater than a diameter of the flexible tubing; and
   the flexible tubing is configured to expand within the U-channeling when pressurized to increase the contact surface area between the U-channeling and the flexible tubing.

2. The heat exchanger according to claim 1, wherein the flexible tubing is arranged to carry the fluid around the backing plate in a continuous path, the flexible tubing having a tubing inlet for receiving the fluid into the heat exchanger and an outlet for passing the fluid out of the heat exchanger, the heat exchanger being configured to facilitate the heat exchange between the fluid and the solar photovoltaic panel.

3. The heat exchanger according to claim 1, further comprising a metallic layer positioned across the flexible tubing, the metallic layer is positioned between the flexible tubing and the solar photovoltaic panel when the heat exchanger is affixed to the solar photovoltaic panel.

4. The heat exchanger according to claim 1 further comprising a rear panel, the rear panel being positioned behind the backing plate, the rear panel having a reflective surface to reflect heat from the backing plate.

5. The heat exchanger according to claim 4, wherein the rear panel is configured to reflect the heat from the backing plate at lower temperatures but acts as a heat sink at higher temperatures.

6. The heat exchanger according claim 1, wherein the heat exchanger is divided into a plurality of heat cells, the plurality of heat cells being defined by insulation positioned between the backing plate and a rear panel, the insulation being configured to limit airflow along a length of the heat exchanger.

7. The heat exchanger according to claim 1, wherein the heat exchanger is maintained in thermal contact with the solar photovoltaic panel by at least one rearward affixation bar affixing the heat exchanger to the solar photovoltaic panel, the rearward affixation bar being configured to engage with the solar photovoltaic panel by being sprung to drive the heat exchanger into contact with the solar photovoltaic panel.

8. A heat exchange unit for a solar photovoltaic panel comprising:
the heat exchanger according to claim 1;
a frame to contain the heat exchanger.

9. A photovoltaic thermal heat exchange system comprising the solar photovoltaic panel and at least one heat exchange unit comprising at least one heat exchanger in accordance with claim 1, the at least one heat exchange unit affixed to the solar photovoltaic panel, each heat exchanger being connected to a fluid path, the photovoltaic thermal heat exchange system being configured to carry the fluid from a pump through the fluid path and through the flexible tubing of the heat exchanger.

10. The photovoltaic thermal heat exchange system according to claim 9, further comprising at least one temperature sensor to monitor a temperature of the fluid in the fluid path.

11. The photovoltaic thermal heat exchange system according to claim 10 further comprising a flow rate control unit, the flow rate control unit being configured to control a rate of flow of the fluid in dependence on the temperature of fluid.

12. The photovoltaic thermal heat exchange system according to claim 11 further comprising at least one pressure sensor positioned in the fluid path.

13. The heat exchange unit according to claim 8, further comprising a manifold, the manifold being configured to provide a fluid connection to the heat exchanger, the manifold comprising a tube and having at least one extension pipe extending from the tube, the extension pipe being configured for quick-fit connection to the heat exchanger to carry the fluid between the manifold and the flexible tubing of the heat exchanger.

14. The heat exchange unit according to claim 13 comprising insulation applied to the tube.

15. The photovoltaic thermal heat exchange system according to claim 9, further comprising a control system, a plurality of the heat exchangers, a fluid path through the plurality of the heat exchangers and a pump for creating fluid flow in the photovoltaic thermal heat exchange system, the photovoltaic thermal heat exchange system further comprising a plurality of sensors for providing system measurements to the control system,
wherein the control system controls operating parameters for the photovoltaic thermal heat exchange system in dependence on the system measurements.

16. The photovoltaic thermal heat exchange system according to claim 15 wherein the plurality of sensors comprise at least one of:
temperature sensors;
pressure sensors; or
sonic flow meters.

17. The photovoltaic thermal heat exchange system according to claim 15 wherein the operating parameters comprise at least one of:
a flow rate of the fluid;
a temperature of the fluid;
a position of valves in the photovoltaic thermal heat exchange system.

18. The heat exchanger according to claim 4 comprising at least one spacer to separate the rear panel from the backing plate.

19. The heat exchanger according to claim 1, wherein the flexible tubing is silicone tubing.

20. The heat exchanger according to claim 1, wherein the flexible tubing is an elastomer, and the flexible tubing being configured to expand is configured to:
define a relaxed condition in which the flexible tubing has a first surface contact amount with the U-channeling and the solar photovoltaic panel, and
define an expanded condition when the flexible tubing is pressurized under pressure of the fluid in which the flexible tubing has a second surface contact amount with the U-channeling and the solar photovoltaic panel, wherein the second surface contact amount is greater than the first surface contact amount.

21. The heat exchanger according to claim 1 wherein when pressurized the flexible tubing expands to fill interstices between the surface of the U-channeling and the surface of the flexible tubing, and the solar photovoltaic panel and the surface of the flexible tubing.

22. The heat exchange unit according to claim 1, wherein the flexible tubing is arranged to carry the fluid around the backing plate in a continuous path, the flexible tubing having a tubing inlet for receiving the fluid into the heat exchanger and an outlet for passing the fluid out of the heat exchanger, the flexible tubing being arranged in parallel runs with edge loops joining adjacent parallel runs, the edge loops being accommodated within a frame.

* * * * *